United States Patent [19]

Kell

[11] 3,757,822
[45] Sept. 11, 1973

[54] DIRECTIONAL SHIFT INHIBITOR
[75] Inventor: Nathaniel B. Kell, Indianapolis, Ind.
[73] Assignee: General Motors Corporation, Detroit, Mich.
[22] Filed: June 15, 1972
[21] Appl. No.: 262,958

[52] U.S. Cl............ 137/625.61, 192/87.12, 192/51, 192/103 F, 91/413, 200/80
[51] Int. Cl............................................. F16d 25/10
[58] Field of Search.............................. 137/625.61; 192/87.12, 87.18, 51, 103 F, 103 FA, 89.19

[56] References Cited
UNITED STATES PATENTS
3,348,644  10/1967  Hilpert.......................... 192/87.19 X
3,433,266  3/1969   Bidlack.......................... 137/625.61
3,540,556  11/1970  Snoy.................................. 192/4 C
3,692,160  9/1972   Hilpert.............................. 192/4 C Primary Examiner—Benjamin W. Wyche
Attorney—Warren E. Finken et al.

[57] ABSTRACT

The directional shift inhibitor illustrated includes a valve mechanism which cooperates with a governor-actuated solenoid arrangement to alternately control the flow of fluid to forward and reverse clutches at predetermined low speeds regardless of the speed at which the operator shifts from forward-to-reverse or reverse-to-forward operation.

8 Claims, 3 Drawing Figures 3,757,822

DIRECTIONAL SHIFT INHIBITOR

The invention relates generally to vehicular transmissions and, more particularly, to directional shift inhibitors therefor.

Vehicles or machines that operate predominantly in an alternating forward-to-reverse and reverse-to-forward cycle require maximum judgment and skill on the part of the operator. The directional shift must be made at precisely the right time to prevent excessive shock and stresses on the drive line and/or the transmission. It is desirable to incorporate an inhibitor system which relieves the operator of having to judge the speed at which to shift to the opposite direction of travel. With the subject device, the shift can be made at any speed, and the application of the other of the forward and reverse clutches will be automatically delayed until the speed of the equipment is reduced to a predetermined point where travel direction can be safely reversed.

Accordingly, a principal object of the invention is to provide an improved directional shift inhibitor for use with the forward and reverse clutches of a transmission, for automatically delaying the engagement of the selected clutch until the speed of the vehicle has slowed to a predetermined speed, regardless of the speed at which the operator performs the manual shifting operation.

Another object of the invention is to provide an improved directional shift inhibitor which may be readily adapted to a transmission which has not been equipped with such equipment, or which may be incorporated in the transmission hydraulic control system as original equipment.

A further object of the invention is to provide a directional shift inhibitor including an improved cooperating valve, solenoid, and centrifugal weight arrangement.

Still another object of the invention is to provide a directional shift inhibitor wherein an inhibitor valve embodies two sets of dual pins axially slidably mounted in opposite ends of the valve for alternately retaining the valve in two clutch-operative positions in cooperation with a pair of end chamber-pressure-controlling needle valves which react to the operative position of a centrifugal weight member via a pair of electrical contacts and a solenoid.

A more specific object of the invention is to provide a directional shift inhibitor arrangement wherein an inhibitor valve is automatically retained in one position after a manual shift is made until vehicle speed has reduced to a predetermined value. This is accomplished by virtue of a governor weight member, under the action of centrifugal force, causing a solenoid to remain energized, thereby preventing a spring-loaded needle valve from blocking off the exhaust of fluid under pressure from a chamber adjacent an end of the inhibitor valve, while a pair of pins slidably mounted in an axial passage formed in an end of the inhibitor valve are subjected to the fluid pressure to react against an end plate and against the inhibitor valve to retain the inhibitor valve in position. Once the speed has reduced to the desired value, the solenoid is deenergized when the weight member opens a pair of electrical contacts, thereby causing the end chamber to be closed off by the needle valve, overcoming the pressure on the pins and shifting the inhibitor valve to control the flow of fluid to the other of the forward or reverse clutches. Thereafter a duplicate pair of pins slidably mounted in an axial passage formed in the other end of the inhibitor valve are subjected to the fluid pressure to react against an opposite end plate to retain the inhibitor valve in its new position even after the vehicle reattains a high speed causing the centrifugal weight member to once again open the end chamber needle valve.

These and other objects and advantages of the invention will be apparent when reference is made to the following description and accompanying drawings, wherein.

Figure 1:
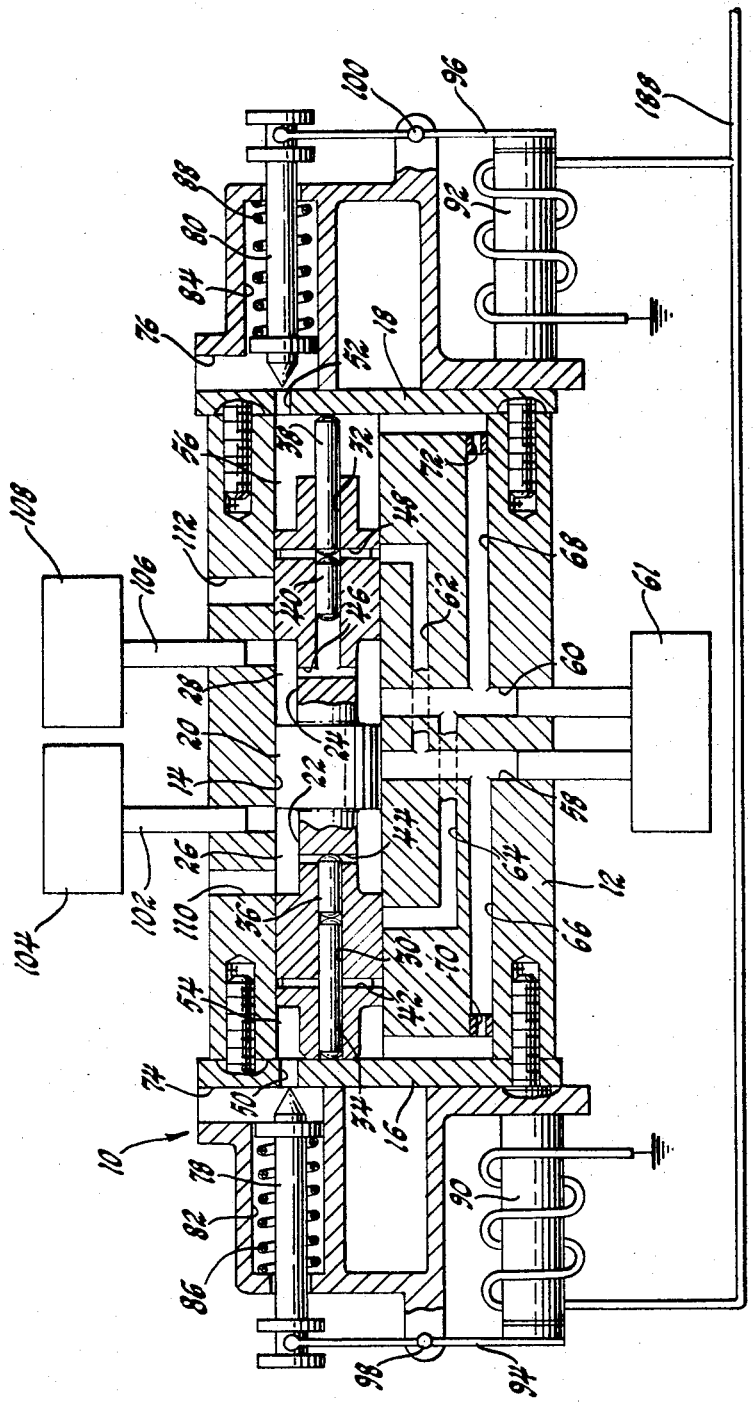
FIG. 1 is a cross-sectional schematic view of a valve body embodying the invention.

Referring now to the drawings in greater detail, FIG. 1 illustrates an inhibitor valve assembly 10 including a valve body or housing 12 having a bore 14 formed therein terminated by end plates 16 and 18. An inhibitor valve 20 is slidably mounted in the bore 14 and has annular grooves 22 and 24 forming annular chambers 26 and 28 with the bore 14. Axial passages 30 and 32 of a predetermined length are formed in the respective ends of the inhibitor valve 20. Two sets of long and short pins 34 and 36, and 38 and 40, respectively, are slidably mounted in the respective axial passages 30 and 32. Radial passages 42, 44, 46, and 48 are formed in the inhibitor valve 20 at predetermined points therealong, the radial passages 44 and 46 communicating with the annular chambers 26 and 28, respectively. Openings 50 and 52 are formed in the end plates 16 and 18, respectively, communicating with variable end chambers 54 and 56 adjacent the respective pin 34 and 38 ends of the valve 20.

Passages 58 and 60 are formed in the housing 12 for alternately communicating fluid under pressure from a suitable source 61 (which may comprise a forward-reverse selector valve) to the chambers 26 and 28, respectively, depending upon the axial location of the valve 20. Branch passages 62 and 64, formed in the housing 12, communicate between the respective passages 58 and 60 and the bore 14 for alternately communicating with the radial passages 48 and 42, respectively, again depending upon the axial location of the inhibitor valve 20. Branch passages 66 and 68, formed in the valve housing 12, communicate at all times between the respective passages 58 and 60 and the end chambers 54 and 56, respectively. Fixed restrictions or orifices 70 and 72 are formed in the respective branch passages 66 and 68.

Exhaust ports 74 and 76 are formed in the valve housing 12 adjacent the respective openings 50 and 52 of the end plates 16 and 18. Needle valves 78 and 80 are slidably mounted in respective passages 82 and 84 formed in the housing 12 for alternately closing off communication between the end-plate openings 50 and 52 and the respective exhaust ports 74 and 76. Springs 86 and 88 are mounted around respective needle vlves 78 and 80 in the respective passages 82 and 84, urging the needle valves 78 and 80 toward respective openings 50 and 52. A pair of solenoids 90 and 92, mounted on the housing 12, serve to move the respective needle valve 78 and 80 via respective lever arms 94 and 96, each pivotally mounted at an intermediate point therealong on respective pivot pins 98 and 100 secured to opposite ends of the valve housing 12.

A passage 102 communicates between the annular chamber 26 and a reverse clutch 104, while a passage 106 communicates between the other annular chamber 28 and a forward clutch 108. Exhaust ports 110 and 112, formed in the valve housing 12, serve to alternately exhaust the annular chambers 26 and 28, depending upon the axial position of the inhibitor valve 20.

Figure 2:
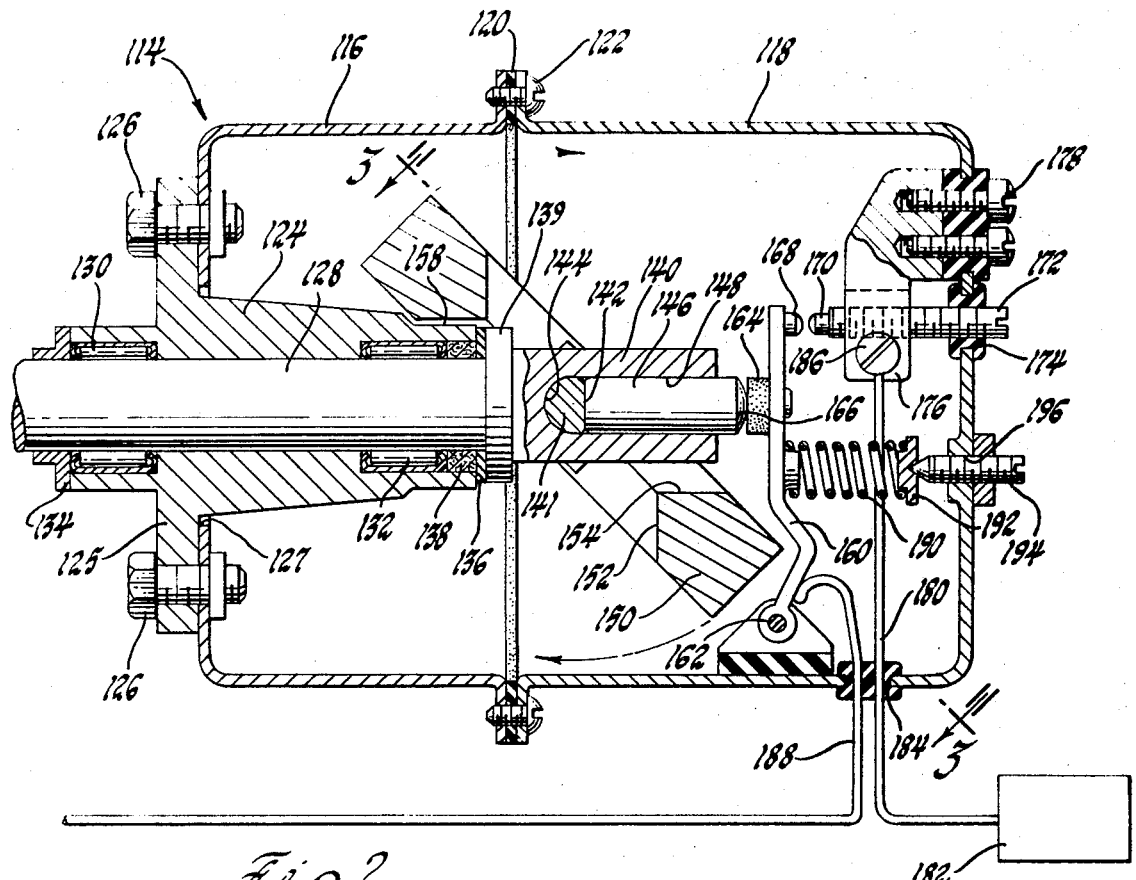
FIG. 2 is a cross-sectional view of a governor mechanism embodied in the invention.

Referring now to FIG. 2, a governor assembly 114 includes a housing formed of two parts 116 and 118, separated by a gasket 120 and connected by bolts 122. A hub or base member 124 is secured at an external flange 125 thereof to the housing section 116 by bolts 126. The base member 124 extends into the housing 116/118 through an opening 127 formed in an end wall of the housing section 116. A shaft 128 is supported on needle bearings 130 and 132 in the base member 124, the shaft 128 being driven by the vehicle drive line or the transmission output. A pair of thrust washers 134 and 136 abut against the end faces of the base member 124, with a seal 138 mounted around the shaft 128 between the thrust washer 136 and the needle bearings 132.

Figure 3:
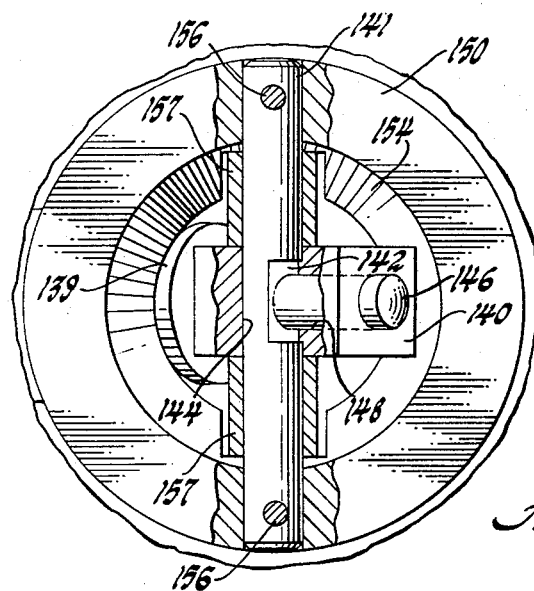
FIG. 3 is a fragmentary cross-sectional view taken along the plane of line 3—3 of FIG. 2, as if FIG. 2 were a full view, and looking in the direction of the arrows.

A collar 139 is formed on the inner end of the shaft 128, adjacent the thrust washer 136. A square cross-sectioned extension 140 is formed to extend from the collar 139, axially aligned with the shaft 128. A pivot pin or shaft 141, having a flat, centrally located surface 142 (FIG. 3) formed thereon, is mounted through an opening 144 formed transversely through the shaft extension 140. A pin 146 is slidably mounted in an axial opening 148 formed in the end of the shaft extension 140, illustrated in FIG. 2 seated against the flat surface 142 of the shaft 141. A disc-like weight member 150, having conical openings 152 and 154 formed on opposite sides thereof, is secured to the shaft 141 by two lock pins 156 (FIG. 3) and retained concentric with the axis of the shaft extension 140 by two spacers 157. The conical opening 152 cooperates with an outer cylindrical surface 158 formed on the base or hub member 124 during the operational movement of the weight member 150.

A contact arm 160 is pivotally mounted at one end thereof on a pivot pin 162 secured to an inner wall of the governor assembly housing section 118. An abutment 164 is formed on the contact arm 160 adjacent the exposed end 166 of the pin 146. A first electrical contact 168 is secured adjacent the free end of the contact arm 160, on the side opposite the abutment 164. A second electrical contact 170 is formed on the inner end of an adjustment screw 172 which is mounted through a sealed opening 174 formed in a wall of the housing section 118, the contact 170 being axially aligned with the contact 178. The adjustment screw 172 is threadedly extended through a bracket 176 which is secured to the housing section 118 by bolts 178. A first wire lead 180 from a suitable power source, represented by 182, extends through a sealed opening 184 into the governor housing 116/118, wherein it is secured to the bracket 176 by a screw 186. A second wire lead 188 is connected to the contact arm 160 and extends from the governor housing 116/118 through the sealed opening 184 to the solenoids 90 and 92 (FIG. 1) mounted on the valve housing 12.

The abutment 164 of the arm 160 is urged into contact with the end 166 of the pin 146, and the contact 168 urged away from the adjustably mounted contact 170, by virtue of a spring 190 mounted between an intermediate point of the contact arm 160 and a spring retainer 192 which is adjustably mounted against an adjustment screw 194 threadedly extended through a threaded opening 196 formed in a wall of the governor housing section 118.

OPERATION

Referring now to FIG. 1, the inhibitor valve 20 is in the position it would assume during operation in a forward direction, at a vehicle speed exceeding that at which a directional shift should be made. In this position, fluid under pressure from the source 61 is being directed to the forward clutch 108 via the inlet passage 60, the annular chamber 28, and the outlet passage 106. The inhibitor valve 20 is caused to remain in the leftward position shown by virtue of the fluid in the radial passage 46 and the axial passage 32 forcing the pins 40 and 38 to the right and the valve 20 the left, to their respective extreme positions against the end plates 18 and 16, respectively. In this position, fluid is exhausted from the reverse clutch 104 via the passage 102, the annular chamber 26 and the exhaust port 110.

It may be noted that the needle valve 80 is being held away from the opening 52, against the force of the spring 88, allowing the fluid being communicated from the passage 60 via the branch passage 68, past the restriction 72, to the end chamber 56, to be bled off through the exhaust port 76. The needle valve 80 is retained in its open position by virtue of the solenoid 92 having pivoted the lever 96 in a clockwise direction about the pivot pin 100. This results from the shaft 128 (FIG. 2) being rotated fast enough in response to vehicle speed to have caused the weight member 150 to rotate in a clockwise direction, turning the shaft 141 whose normal round surface, as opposed to the flat-formed surface 142, forces the pin 146 outwardly, urging the movable contact 168 into contact with the adjustably fixed contact 170. This, of course, energizes the solenoid 92.

Should the vehicle be slowed down or stopped, the weight member 150 would rotate in a counterclockwise direction in FIG. 2, allowing the spring 190 to urge the contact arm 160 leftwardly, thus opening the contacts 168 and 170. This would deenergize the solenoid 92 (FIG. 1), allowing the spring 88 to close the needle valve 80 against the opening 52, retaining a fluid pressure in the end chamber 56 to hold the valve 20 in its leftward position.

Assume now, however, that, with the vehicle moving in a fast forward direction, the operator has reason to shift into a reverse operation. Without the inhibitor valve system 10, such action would require maximum skill on the part of the operator in effecting a shift-change at precisely the right speed to prevent excessive shock and stresses on the drive line and/or the transmission. In these same circumstances, with the inhibitor valve system 10 included, the shift selection can be made at any speed, and the system 10 will automatically delay the application of the reverse clutch 104 until the speed is reduced to the point where travel direction can be safely reversed. This is accomplished in the following manner.

The manual shift to reverse causes the fluid pressure to be exhausted from the passage 60 (FIG. 1) and directed into the passage 58 in a conventional manner, from whence it is communicated via the passage 66 and the orifice 70 to the end chamber 54, and via the passage 62 to the radial passage 48, intermediate the pins 38 and 40. This serves to urge the pin 40 leftwardly, since the radial passage 46 is now exhausted, and retains the pin 38 against the end plate 18. The inhibitor valve 20 is thus maintained in its leftmost position by the pressure intermediate the pins 38 and 40, the pressure in the left end chamber 54 being exhausted past the opening 50 to the exhaust port 74 since the speed of the vehicle is still such that the weight member 150 is retaining the contacts 168 and 170 closed, thus still energizing the solenoid 90 which is holding the needle valve 78 away from the opening 50. With the inhibitor valve 20 in the position just described, fluid is thus blocked from entering the passage 102 leading to the reverse clutch 104.

Once the vehicle speed decreases to a predetermined point whereat the weight member 150 (FIG. 2) is rotated under the action of the spring 190 on the flat surface 142 of the shaft 141 in a counterclockwise direction far enough to permit the contacts 168 and 170 to be opened by the spring 190, the solenoid 90 (FIG. 1) is deenergized and the spring 86 is thus able to urge the needle valve 78 to the right to block off the exhaust opening 50. While the needle valve 80 is also closed against the opening 52 at this time, it is apparent that it has no effect on the exhausted right end chamber 56. Pressure now retained in the left end chamber 54 forces the inhibitor valve 20 to the right, overcoming the reaction of the smaller area pin 38 against the end plate 18. Any resultant hydraulic block between the pins 38 and 40 may be alleviated by a predetermined clearance around the pins 38 and 40 in the passage 32, or by a flat or groove formed along the length of the pin 38 (as well as along the pin 34 for the alternate operation).

The rightward movement of the inhibitor valve 20 thus allows the fluid under pressure from the passage 58 to enter the annular chamber 26 and the passage 102 to actuate the reverse clutch 104. Pressurized fluid also enters the radial passage 44, pushing the pins 34 and 36 leftward until the pin 34 abuts against the end plate 16 to thereafter retain the valve 20 in its rightward position. Such rightward retention continues after the vehicular speed has increased to the point whereat the weight member 150 once again rotates to close the contacts 168 and 170 and energize the solenoid 90 to thus retract the needle valve 78 from the exhaust opening 50.

When shifting from reverse operation to forward, the opposite sequence of events occurs, and the reverse-to-forward shift will be inhibited in the same manner as the above-described forward-to-reverse shift.

It may be noted by referring to FIG. 2 that movement of the centrifugal weight member 150 in response to the speed of the shaft 128 may be controlled by manual adjustment of the adjustment screw 194, thereby changing the force of the spring 190 on the pin 146 and the flat-sided shaft 141 on which the weight member 150 is mounted. Additionally, the speed at which the weight member 150 is effective to close and/or open the electrical contacts 168 and 170 may be regulated by manual adjustment of the other adjustment screw 172.

It should be apparent that the invention provides an improved directional shift inhibitor wherein the inhibitor valve embodies two sets of dual pins axially slidably mounted in opposite ends of the valve for alternately retaining the valve in two clutch-operative positions in cooperation with a pair of end chamber pressure-controlling needle valves which react to the operative position of a centrifugal weight member via a pair of electrical contacts and a solenoid, to thus automatically delay the engagement of the selected clutch until the speed of the vehicle has slowed to a predetermined speed, regardless of the speed at which the operator performs the manual shifting operation.

While but one embodiment of the invention has been shown and described, other modifications thereof are possible.

I claim:

1. For use with a vehicle having forward and reverse transmission clutches, a directional shift inhibitor comprising a valve body, an inhibitor valve slidably mounted in said valve body, a conduitry system formed in said valve body, a source of fluid under pressure in said conduitry system, the flow of said fluid through alternate portions of said conduitry system being controlled by the axial movement of said inhibitor valve, pin means axially slidably mounted in said inhibitor valve and responsive to said fluid under pressure for alternately holding said inhibitor valve in its two extreme axial positions, valve means operatively connected to said conduitry system for controlling the retention and exhaust of the fluid pressure adjacent the ends of said inhibitor valve for overcoming the holding effect of said fluid on said pin means to thereby move said inhibitor valve upon the attainment of a predetermined speed of said vehicle, and centrifugal means operatively connected to said valve means for actuating said valve means in response to predetermined vehicle speeds.

2. For use with a vehicle having forward and reverse transmission clutches, a directional shift inhibitor comprising a valve body, an inhibitor valve slidably mounted in said valve body, a conduitry system formed in said valve body, a source of fluid under pressure in said conduitry system, the flow of said fluid through alternate portions of said conduitry system being controlled by the axial movement of said inhibitor valve, first and second aligned axial passages formed in the ends of said inhibitor valve, a set of two pins slidably mounted in each of said first and second axial passages and responsive to said fluid under pressure for alternately holding said inhibitor valve in its two extreme axial positions, first and second openings formed in said valve body adjacent the respective ends of said inhibitor valve and communicating with said conduitry system, a valve slidably mounted adjacent each of said first and second openings for controlling the opening and closing of said first and second openings to thereby control the pressure adjacent the ends of said inhibitor valve for overcoming the effect of said fluid pressure on said two sets of two pins to move said inhibitor valve upon the attainment of a predetermined speed of said vehicle, and centrifugal means operatively connected to said two valves for actuating said two valves in response to predetermined vehicle speeds.

3. For use with a vehicle having forward and reverse transmission clutches, a directional shift inhibitor comprising a valve body, an inhibitor valve slidably mounted in said valve body, a conduitry system formed in said valve body, a source of fluid under pressure in said conduitry system, the flow of said fluid through alternate portions of said conduitry system being controlled by the movement of said inhibitor valve, pin means axially slidably mounted in said inhibitor valve and responsive to said fluid under pressure for alternately holding said inhibitor valve in its two extreme axial positions, valve means operatively connected to said conduitry system for controlling the pressure adjacent the ends of said inhibitor valve for overcoming the effect of said pin means to move said inhibitor valve at a predetermined speed of said vehicle, solenoid means operatively connected to said valve means, and a governor assembly including a housing, an engine-driven shaft rotatably mounted in said housing, a centrifugal weight member mounted for rotation with said shaft, a first contact secured to said housing, a second contact movable in response to the movement of said weight member under the action of centrifugal force alternately into and out of contact with said first contact, wire leads connected between said first contact and said solenoid means.

4. The directional shift inhibitor described in claim 3, and manual adjustment means operatively connected to said first contact.

5. The directional shift inhibitor described in claim 3, and manual adjustment means operatively connected to said second contact.

6. For use with a vehicle having forward and reverse transmission clutches, a directional shift inhibitor comprising a valve body, an inhibitor valve slidably mounted in a bore formed in said valve body, a conduitry system formed in said valve body, a source of fluid under pressure in said conduitry system, first and second pairs of aligned pins axially slidably mounted in opposite ends of said inhibitor valve and responsive to said fluid under pressure for alternately holding said inhibitor valve in its two extreme axial positions, said conduitry system including first and second annular grooves formed in said inhibitor valve forming first and second annular chambers with said bore, first and second annular recesses formed on opposite ends of said inhibitor valve forming first and second end chambers with said bore, first and second passages formed in said valve body for alternate communication between said fluid source and said respective first and second annular chambers, first and second branch passages formed in said valve body for alternate communication between said first and second passages and said respective first and second end chambers, third and fourth branch passages formed in said valve body for alternate communication between said first and second passages and intermediate said respective second and first pairs of aligned pins, first and second exhaust ports formed in said valve body communicating with said respective first and second end chambers, third and fourth passages formed in said valve body for communication between said first and second annular chambers and said respective reverse and forward clutches, and third and fourth exhaust ports formed in said valve body for alternate communication with said first and second annular chambers, the alternate flow of said fluid between said first and third passages and between said second and fourth passages being controlled by the axial movement of said inhibitor valve, first and second valves slidably mounted in said valve body for controlling the retention and exhaust of said fluid under pressure in said respective first and second end chambers for overcoming the effect of said fluid pressure on said respective second and first pairs of aligned pins to move said inhibitor valve upon the attainment of a predetermined speed of said vehicle, and centrifugal weight means operatively connected to said first and second valves for actuating said first and second valves to control said respective first and second exhaust ports in response to predetermined vehicle speeds.

7. A directional shift inhibitor valve body comprising an inhibitor valve slidably mounted in a bore formed in said valve body, first and second pairs of aligned pins axially slidably mounted in opposite ends of said inhibitor valve for alternately holding said inhibitor valve in its two extreme axial positions, a conduitry system formed in said valve body, said conduitry system including first and second annular grooves formed in said inhibitor valve forming first and second annular chambers with said bore, first and second annular recesses formed on oppoiste ends of said inhibitor valve forming first and second end chambers with said bore, first and second inlet passages formed in said valve body for alternate communication with said respective first and second annular chambers depending upon the axial position of said inhibitor valve, first and second branch passages formed in said valve body for alternate communication between said first and second inlet passages and said respective first and second end chambers, third and fourth branch passages formed in said valve body for alternate communication between said first and second inlet passages and intermediate said respective second and first pairs of aligned pins, first and second exhaust ports formed in said valve body communicating with said respective first and second end chambers, first and second outlet passages formed in said valve body for communication with said respective first and second annular chambers, and third and fourth exhaust ports formed in said valve body for alternate communication with said first and second annular chambers, first and second spring-loaded valves slidably mounted in said valve body, first and second solenoids mounted on said valve body, and first and second levers pivotally mounted at an intermediate point thereof on said valve body and connected at opposite ends thereof to said respective first spring-loaded valve and said first solenoid and to said second spring-loaded valve and said second solenoid.

8. For use with a vehicle having forward and reverse transmission clutches, a directional shift inhibitor comprising a valve body, an inhibitor valve slidably mounted in a bore formed in said valve body, a conduitry system formed in said valve body, a source of fluid under pressure in said conduitry system, first and second pairs of aligned pins axially slidably mounted in opposite ends of said inhibitor valve and responsive to said fluid under pressure for alternately holding said inhibitor valve in its two extreme axial positions, said conduitry system including first and second annular grooves formed in said inhibitor valve forming first and second annular chambers with said bore, first and second annular recesses formed on opposite ends of said inhibitor valve forming first and second end chambers with said bore, first and second passages formed in said valve body for alternate communication between said fluid source and said respective first and second annular chambers, first and second branch passages formed in said valve body for alternate communication between said first and second passages and said first and second end chambers, third and fourth branch passages formed in said valve body for alternate communication between said first and second passages and intermediate said respective second and first pairs of aligned pins, first and second exhaust ports formed in said valve body communicating with said respective first and second end chambers, third and fourth passages formed in said valve body for communication between said first and second annular chambers and said respective reverse and forward clutches, and third and fourth exhaust ports formed in said valve body for alternate communication with said first and second annular chambers, the alternate flow of said fluid between said first and third passages and between said second and fourth passages being controlled by the axial movement of said inhibitor valve, first and second spring-loaded valves slidably mounted in said valve body for controlling the retention and exhaust of said fluid under pressure in said respective first and second end chambers for overcoming the effect of said fluid pressure on said respective second and first pairs of aligned pins to move said inhibitor valve upon the attainment of a predetermined speed of said vehicle, first and second solenoids mounted on said valve body, and first and second levers pivotally mounted at an intermediate point thereof on said valve body and connected at opposite ends thereof to said respective first spring-loaded valve and said first solenoid and to said second spring-loaded valve and said second solenoid, a governor including a housing, a drive shaft rotatably mounted in said housing, a pin member axially slidably mounted in said drive shaft adjacent the inner end thereof, a fixed and a movable electrical contact mounted in said housing axially aligned with said pin member, a wire lead connected between said contacts and said first and second solenoids, and centrifugal weight means operatively mounted on said drive shaft for moving said pin member to alternately open and close said contacts in response to predetermined vehicle speeds and thereby respectively deenergizing and energizing said solenoids to actuate said first and second spring-loaded valves to control said respective first and second exhaust ports.

* * * * *